Mar. 13, 1923. 1,448,304
F. KIRKWOOD
TIRE HOLDER
Filed Mar. 23, 1921
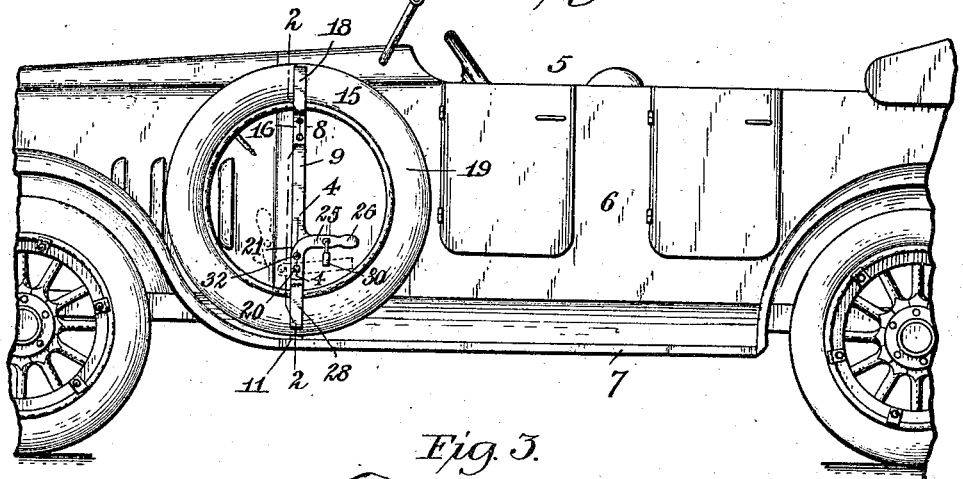
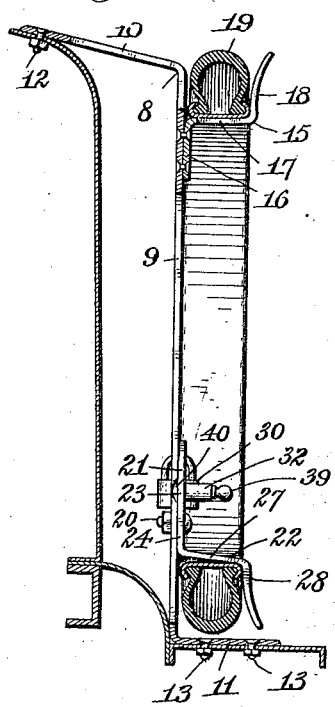
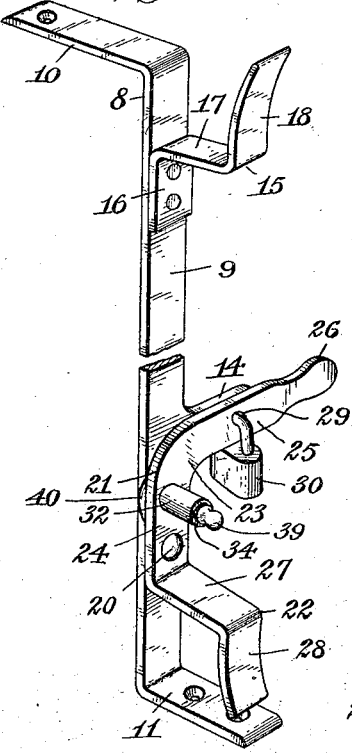
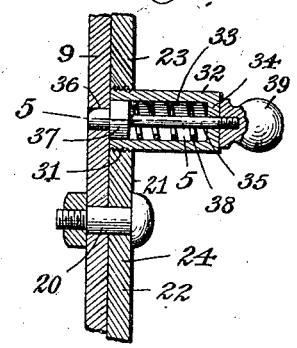
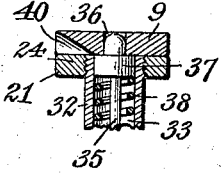
Witness:
J.J. Oberst
Frederick Kirkwood, Inventor.
By Emil Neuhart
Attorney.

Patented Mar. 13, 1923.

1,448,304

UNITED STATES PATENT OFFICE.

FREDERICK KIRKWOOD, OF BUFFALO, NEW YORK.

TIRE HOLDER.

Application filed March 23, 1921. Serial No. 454,682.

*To all whom it may concern:*

Be it known that I, FREDERICK KIRKWOOD, a citizen of the United States, residing at Buffalo, in the county of Erie and State of New York, have invented certain new and useful Improvements in Tire Holders, of which the following is a specification.

My invention relates to tire holders, and more particularly to a tire holder for automobiles whereby a spare tire may be conveniently retained on and locked to the automobile, and be as readily removed when needed.

One of the objects of my invention is to provide a tire holder of simple construction which will effectually hold a tire and prevent movement of the tire circumferentially as well as laterally.

A further object is, to provide a tire holder which can be conveniently attached to the side of an automobile at any point along the length of its running board and which consists of few parts and can be cheaply constructed.

With these and other objects in view, the invention consists in the novel features of construction and in the arrangement and combination of parts to be hereinafter described and more particularly pointed out in the subjoined claims.

In the drawings:—

Fig. 1 is a side elevation of a portion of an automobile, showing my improved tire holder secured thereto and a tire held thereby and locked therein.

Fig. 2 is an enlarged vertical section taken on line 2—2, Fig. 1, the section being taken through a portion of the automobile.

Fig. 3 is a broken perspective view of the holder.

Fig. 4 is an enlarged vertical section taken on line 4—4, Fig. 1.

Fig. 5 is a transverse section taken on line 5—5, Fig. 4.

Referring now to the drawings in detail, like numerals of reference, refer to like parts in the several figures.

The reference numeral 5 designates the automobile considered as a whole, 6 the body thereof and 7 the running board.

The tire holder, designated by the numeral 8, comprises an upright or main member 9, which is preferably formed of flat bar material and has at its upper end an inwardly-directed securing portion 10, and at its lower end an outwardly-directed securing portion 11. As clearly shown in Fig. 2, the upper securing portion 10 is fastened to the body of the automobile by means of a bolt 12, or otherwise, and while I have shown said securing portion secured to the cowl of the body portion, it is apparent that it may be secured to the upper edge of the side wall of said body portion or to any other portion thereof along the range of the running board 7. The lower securing portion 11 bears against the upper surface of the running board and is fastened thereto by means of bolts 13.

The upright or main member 9 has an arm 14 extending from one edge thereof, either forwardly or rearwardly, as may be desired, the same being shown as extending rearwardly in the drawings.

Riveted or otherwise secured to the upright or main member near its upper end is a Z-shaped retainer 15, which is also formed of flat bar material, and comprises a securing portion 16, a supporting portion 17 at a right-angle to said securing portion and a retaining portion 18 extending upwardly from the outer end of said supporting portion and being spaced from said upright or main member. Said retaining portion is flared outwardly at its upper end to facilitate the entrance of a tire, designated by the numeral 19, into the space between the same and said upright or body portion. The Z-shaped retainer may be said to form an upwardly-opening hook from which the tire is to be suspended so that the portion of the tire diametrically opposite that portion within the hook will be positioned in front of the upright at its lower end and above the outwardly-directed securing portion 11.

Pivotally secured to the upright or main member 9, as at 20, is a combined retainer and lock-member 21, which is also formed of flat bar material with its retainer portion 22 in a plane beneath the pivot 20 and with its lock portion 23 in a plane above said pivot. Said combined retainer and lock member has a flat intermediate portion 24 which lies against the outer face of the upright or main member 8 and at the upper end of said intermediate portion a rearwardly extending arm 25 is provided, which lies in contact with the outer face of the arm 14 and extends a distance beyond the rear end of said arm, as at 26, to serve as a handle, whereby the combined retainer and lock member can be actuated. Said arm 25, with its projecting handle portion 26, constitute the lock member 21 hereinbefore referred to. At the lower end of said intermediate portion the flat bar material from which it is formed is bent outwardly, as at 27, thence downwardly, as at 28, to form the retainer portion 22, said downwardly bent portion being flared outwardly toward its lower end, for a purpose to appear hereinafter.

The arm 25 is provided with an opening 29, through which and an opening in the arm 14 registering therewith, the hasp of a padlock 30 may be passed to lock the combined retainer and lock member 21 in position. When said member 21 is in locking position, the outwardly bent portion 27 of the retainer portion 22 lies in contact with the inner periphery of the tire, or in contact with the demountable rim when used, as clearly shown in Fig. 2, while the downwardly bent portion 28 of said retainer extends downwardly in front of the tire.

As a means of retaining the combined retainer and lock member 21 in holding position without locking the same, I provide the same with a threaded opening 31 at a point above the pivot 20 thereof, and thread into said opening a combined spring-holder and pin-guide 32 which is cylindrical and hollowed out, as at 33, and closed at its outer end, as at 34. Slidable within said combined spring-holder and pin-guide or hollow cylindrical member 32 is a retainer pin 35 which is adapted to have its inner end enter an opening 36 in the upright or main member 8, said pin having a collar or enlargement 37 thereon against which one end of a spring 38 bears, said spring being within the hollow cylindrical member and having its other end bearing against the closed end thereof. The retainer pin 35 extends centrally through said spring and through a guide opening in the outer closed end of said hollow cylindrical member and it has a finger grip 39 at its outer end, which bears against said closed end when the inner end of said pin is entered in the opening 36. When grasping the finger grip 39 and drawing the retainer pin 35 outwardly, said pin will be withdrawn from the opening 36 so as to allow the combined retainer and lock member 21 to swing on its pivot. I preferably employ the retainer pin 29 in conjunction with a suitable lock for locking the lock-arm 25 to the arm 14 of the upright, for the reason that if an ordinary pad lock is used to lock the two arms 14 and 25 together, slight movement of the combined retainer and lock member would occur when the automobile travels over uneven surfaces, thereby creating noise and unnecessary wear of the parts and causing rubbing action against the tire, but since the retainer pin 35 fits snugly into the opening 36, such action cannot take place.

As clearly shown in Figs. 1 and 3, the retainer portion 22 at the lower end of the device is in vertical position when the combined retainer and lock member is in holding or locking position; but in order to permit of placing a tire upon the holder, said combined retainer and lock member must be swung into the position shown in dotted lines in Fig. 1, in which position, the retainer portion 22 is in substantially horizontal position.

When said combined retainer and lock member is in the position shown in dotted lines, Fig. 1, all parts thereof are directly in front of the wheel-opening in said tire, which enables a person to place a tire upon the upwardly-opening hook-shaped retainer 15 and permits the lower portion of the tire to be swung inwardly against the lower portion of the upright or main member 9 without coming in contact with the combined retainer and lock member. The tire is thus suspended from the hook-shaped retainer member 15 in the position it is to be retained or locked, and it is then simply necessary to swing the combined retainer and lock member from the position shown in dotted lines in Fig. 1 to that shown in full lines, during which swinging movement the rounded inner end of the retainer pin 35 engages a beveled or cut-away portion 40 formed in the upright or main member and is thereby forced outwardly so that when brought in line with the opening 36 in said upright or main member, it will be forced into the same by the spring 38. During this swinging movement, the outwardly bent portion 27 of the retainer portion 22 will engage the inner periphery of the tire or of the demountable rim, as the case may be, while the downwardly bent portion 28 will engage the side of the tire or rim and force the tire inwardly in firm contact with the upright or main member 9, thus holding the tire so that it can neither move circumferentially nor laterally, thereby preventing noise, and wear on the tire.

It may here be stated that the outwardly flared end of the downwardly bent portion 28 will come in contact with the tire before other parts of the combined retainer and lock member and will act to crowd the tire inwardly against the upright or main member 9, which will be so retained by the upper end of the downwardly bent portion, as clearly shown in Fig. 2.

As the retainer pin 35 alone would not prevent unauthorized persons from removing the tire from the holder, a padlock or other locking means is employed to lock the lock arm 25 to the rearwardly extending arm 14 of the upright or main member, as hereinbefore described.

Having thus described a representative embodiment of the principle of my invention, what I claim is:—

1. A tire holder, comprising an upright adapted to be secured at its upper and lower ends to an automobile, an upwardly-opening hook at the upper end of said upright, and a retainer member pivoted between its ends to the lower end of said upright having a free outwardly bent portion adapted to engage the inner circumference of a tire and an integral laterally extending arm to swing said retainer member.

2. In combination with an automobile, a tire holder comprising an upright having an inwardly-directed securing portion at its upper end adapted to be secured to the body of the automobile and an outwardly-directed securing portion at its lower end adapted to be secured to the running board of the automobile and terminating thereat, a Z-shaped member secured to the outer side of said upright near its upper end forming a tire-supporting hook, and a pivoted retaining-member at the lower end of said upright having an outwardly-bent portion and a downwardly bent portion at the outer end of said outwardly bent portion.

3. In combination with an automobile, a tire holder comprising an upright secured at its upper and lower ends to said automobile and having an arm extending from one edge thereof at a point between its upper and lower ends, an upwardly-opening hook at the upper end of said upright, a pivoted retainer member near the lower end of said upright having an outwardly-bent portion beneath the pivot thereof and a laterally bent portion above the pivot thereof adapted to lie in contact with said arm, and means for locking said laterally-bent portion to said arm.

4. A tire holder comprising a body portion having a fixed retainer member, a pivoted retainer member spaced from said fixed retainer member and a laterally projecting arm in a plane between said fixed retainer member and the pivot of said pivoted retainer member, said arm having an opening therethrough, an arm extending laterally from said pivoted retainer member and having an opening registering with the opening in the laterally projecting arm of said body portion, and a locking device extending through said registering openings.

5. A tire holder, comprising a flat vertically-disposed body portion having means at its upper and lower ends for securing the same to an automobile and having a laterally extending arm between its ends provided with a lock opening, a hook-shaped tire-supporting member at the upper end of said body portion, a combined retainer and lock member at the lower end of said body portion, said combined retainer and lock member having a flat intermediate portion lying against and pivoted to said body portion, an outwardly-bent portion at the lower end of said intermediate portion and a downwardly-bent portion at the outer end of said outwardly-bent portion, said intermediate portion having a laterally extended arm at its upper end provided with a lock opening adapted to register with the lock opening of the laterally extending arm on said body portion when said combined retainer and lock member is in a certain position, and locking means passed through said openings when in registration.

6. A tire holder formed of flat bar material and comprising a body portion having means at opposite ends for securing the same to an automobile, a fixed tire-retainer member on said body portion, and a pivoted tire-retainer member on said body portion spaced from said fixed tire-retainer member, said body portion having an opening and said pivoted retainer member having a spring pressed retainer pin adapted to enter said opening.

7. A tire-holder, comprising a body portion having spaced retainer members thereon and an opening therein, one of said retainer members being pivoted thereto and having a spring-pressed retainer pin adapted to enter the opening in said body portion, and means for locking said pivoted retainer member to said body portion.

8. A tire holder, comprising a body portion having spaced retainer members thereon adapted to engage a tire at different points, one of said retainer members being pivotally secured to said body portion so as to be moved against or away from the inner circumference and the outer side of the tire.

9. A tire holder comprising a body portion having spaced retainer members thereon adapted to engage a tire at different points and having an opening therein, one of said retainer members being pivotally secured to said body portion and having a spring-pressed pin, said body portion having means for guiding said pin into said opening when swinging said pivotally-secured retainer member in line with said body portion.

10. A tire comprising an elongated body portion having a pin-receiving opening in a plane between opposite longitudinal edges thereof and having a cut-away portion extending from one edge thereof toward said opening, a fixed retainer member on said body portion, a second retainer member pivotally secured to said body portion a distance from said fixed retainer member and normally held in alinement with said body portion, said retainer member being adapted to be swung at an angle to said body portion, and a spring-pressed pin carried by said pivotally-secured retainer member and adapted to be moved against the pressure of said spring when said pivotally-secured retainer member is swung from a position at an angle to said body portion to a position in line therewith, said pin being adapted to ride over the cut-away portion of said body portion when swinging the same from angular position in a position in line with said body portion.

In testimony whereof I affix my signature.

FREDERICK KIRKWOOD.